US012079180B2

(12) United States Patent
Wood

(10) Patent No.: US 12,079,180 B2
(45) Date of Patent: Sep. 3, 2024

(54) SEMANTIC LAYER GENERATION

(71) Applicant: AtScale, Inc., San Mateo, CA (US)

(72) Inventor: Dianne Wood, Cupertino, CA (US)

(73) Assignee: AtScale, Inc., Boston, MA (US)

( * ) Notice: Subject to any disclaimer, the term of this patent is extended or adjusted under 35 U.S.C. 154(b) by 22 days.

(21) Appl. No.: 16/022,678

(22) Filed: Jun. 28, 2018

(65) Prior Publication Data
US 2020/0004848 A1    Jan. 2, 2020

(51) Int. Cl.
*G06F 7/00* (2006.01)
*G06F 9/44* (2018.01)
*G06F 16/21* (2019.01)
*G06F 16/28* (2019.01)
*G06F 16/84* (2019.01)
*G06N 5/04* (2023.01)

(52) U.S. Cl.
CPC .......... *G06F 16/212* (2019.01); *G06F 16/289* (2019.01); *G06N 5/04* (2013.01)

(58) Field of Classification Search
CPC ...... G06F 7/00; G06F 79/44; G06F 716/2365; G06F 716/2379; G06F 716/283; G06F 716/288; G06F 716/84; G06F 717/00
USPC ........................................................ 707/603
See application file for complete search history.

(56) References Cited

U.S. PATENT DOCUMENTS

| | | | |
|---|---|---|---|
| 5,740,267 A * | 4/1998 | Echerer | G06T 7/0012 382/284 |
| 6,236,997 B1 | 5/2001 | Bodamer et al. | |
| 6,308,178 B1 | 10/2001 | Chang et al. | |
| 7,668,878 B2 | 2/2010 | Arora et al. | |
| 7,689,582 B2 | 3/2010 | Behnen et al. | |
| 8,041,670 B2 | 10/2011 | Bakalash | |
| 10,621,203 B2 * | 4/2020 | Hunt | G06F 16/283 |
| 2002/0038348 A1 | 3/2002 | Malone | |

(Continued)

OTHER PUBLICATIONS

International Search Report for PCT/US2019/039243; date of mailing Sep. 18, 2019; pp. 8.

(Continued)

*Primary Examiner* — Sherief Badawi
*Assistant Examiner* — Earl Elias
(74) *Attorney, Agent, or Firm* — Armis IP Law, LLC

(57) ABSTRACT

Techniques are presented for generating semantic layers that are used to facilitate data analyses of subject datasets. The semantic layers are generated from data analysis configurations that characterize analysis environments pertaining to the subject datasets rather than from subject dataset metadata that is associated with the subject datasets. Data analysis attributes are extracted from configuration content objects that codify the data analysis configurations. A set of rules are accessed to facilitate mapping of the data analysis attributes to semantic model metadata that constitute the semantic layers. Some of the generated semantic layers comprise virtual data models. The virtual data models and/or recommendations associated with implementation of the semantic layers are presented to users. Certain portions of the semantic layers and/or the configuration content objects may be modified (e.g., in accordance with the implementation recommendations) to facilitate use of the semantic layers when performing data analyses of the subject datasets.

16 Claims, 11 Drawing Sheets

(56) References Cited

U.S. PATENT DOCUMENTS

| | | | |
|---|---|---|---|
| 2005/0050068 A1* | 3/2005 | Vaschillo | G06F 16/25 |
| 2006/0218117 A1 | 9/2006 | Gupta | |
| 2007/0027904 A1 | 2/2007 | Chow | |
| 2007/0028108 A1 | 2/2007 | Cowburn | |
| 2007/0113076 A1 | 5/2007 | Cowburn | |
| 2007/0168334 A1* | 7/2007 | Julien | G06F 16/284 |
| 2010/0125565 A1 | 5/2010 | Burger | |
| 2015/0317374 A1* | 11/2015 | Petitclerc | G06F 16/283 |
| | | | 707/603 |
| 2016/0098037 A1 | 4/2016 | Zornio | |
| 2016/0098448 A1 | 4/2016 | McShane | |
| 2016/0162557 A1 | 6/2016 | DelGobbo et al. | |
| 2016/0314173 A1 | 10/2016 | Lydick | |
| 2017/0091470 A1 | 3/2017 | Infante-Lopez | |
| 2017/0103105 A1 | 4/2017 | Barsness | |
| 2017/0169092 A1* | 6/2017 | Baird | G06F 16/2365 |
| 2017/0235786 A9 | 8/2017 | Faith | |
| 2018/0174059 A1* | 6/2018 | Banerjee | G06N 5/025 |

OTHER PUBLICATIONS

Data Structures for Databases, Jan. 1, 2001, Hammer, Joachim, 24 pages.

Oauth_2_Framework_rfc6749, Oct. 2012, Hardt, Ed., 76 pages.

https://451research.com/report-short?entityId=92407, 451 Research Impact Report, "Kyvos adds SQL support, availability on Google Cloud for OLAP-on-Hadoop" May 8, 2017, 1 page.

https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

International Search Report & Written Opinion of PCT Application No. PCT/US2016/031684, dated Nov. 23, 2017, 6 pages total.

https://en.wikipedia.org/wiki/Semantic_layer "Semantic layer", May 10, 2018, 1 page.

International Search Report & Written Opinion of PCT Application No. PCT/US2016/056484, dated Feb. 7, 2017, 7 pages total.

\* cited by examiner

SEMANTIC LAYER GENERATION

FIELD

This disclosure relates to data analytics, and more particularly to techniques for semantic layer generation.

BACKGROUND

Modern data storage environments are designed and implemented to manage the increasing volume, velocity, and variety of information assets (e.g., data). Although all three components of data management are growing, "variety" often has the most influence on data storage investment and/or implementation decisions. As an example, an enterprise might desire to have access to 100 TB or more of data that comprises some datasets stored in a variety of modern heterogeneous data storage environments (e.g., Hadoop distributed file system or HDFS), as well as some other datasets stored in a variety of legacy data storage environments (e.g., relational database management systems or RDBMS). Another aspect of variety pertains to the structure of the data (e.g., data type) comprising the datasets. Datasets are represented in various structures or formats ranging from schema-free JSON datasets, to delimited flat file datasets, to non-flat datasets (e.g., Avro, Parquet, XML, etc.), to nested data types within other databases (e.g., relational databases, NoSQL databases, etc.). The variety of data types is continually expanding.

The historical evolution of techniques to organize and/or store the many varieties of data has also resulted in an assortment of business intelligence (BI) applications (e.g., data analysis tools) that are in use today. Such BI applications facilitate exploration and visualization of datasets. In many cases, an enterprise might implement multiple BI applications to analyze its mix of datasets. As an example, today's information technology (IT) professional (e.g., data analyst) might interact with four or more BI applications (e.g., Tableau, Excel, QlikSense, Power BI, Business Objects, Cognos, etc.) in the course of their daily work.

The aforementioned increasing "velocity" of data, which pertains to the speed at which data is updated and/or processed, has precipitated new categories of BI applications. Specifically, "self-service" BI applications were introduced to improve the agility of business operations by bringing the time to make critical, data-driven business decisions down to days or even hours, rather than months. Such "self-service" BI applications give the BI users (e.g., who might be business decision-makers with limited technical data analytics experience) the ability to interact with the BI application to quickly perform a new analysis over a dataset. With the proliferation of self-service BI applications, users are now accustomed to a certain level of agility associated with their BI applications and, more generally, with their data analytics environment.

Various techniques are implemented in modern data analytics environments to promote such agility. Some of these techniques involve use of a semantic layer that, in part, presents a logical view of a dataset that abstracts the complexities of the dataset to make it easier for BI application users to analyze. For example, a semantic layer might comprise multidimensional data models that facilitate translation of data statements—written in familiar business terms—to complex data operations that are executed over a particular dataset. In some cases, a semantic layer might be developed and implemented in a client-side BI application. In other cases, a semantic layer might be developed and implemented in a server-side data storage system. In both cases, the complexity of the organization and/or structure of the underlying dataset is abstracted by the semantic layer to help users (e.g., business or technical) more intuitively work with the dataset.

Unfortunately, developing and implementing semantic layers over many different BI applications and over many different datasets presents several challenges. For example, many approaches derive the data models and/or other attributes that comprise the semantic layer from metadata associated with the underlying subject datasets. Such an approach demands large amounts of computing resources, and these large amounts of computing resources are often demanded repeatedly (e.g., for each of the various BI applications that are in use, since each may require a different semantic layer). With such approaches, still more computing resources are consumed when updating the multiple semantic layers. For example, still more computing resources are demanded in order to keep the multiple semantic layers synchronized with changes to the underlying datasets and/or changes to the analytics that are being performed over the datasets. Furthermore, the aforementioned approaches increase the probability that inconsistencies might arise between the result sets due to different semantic layers that are at different states of modification and/or synchronization.

These approaches also provide no mechanism for evaluating and/or improving the efficiency of the semantic layers. What is needed is a technological solution that reduces the computing resources consumed when developing and implementing semantic layers for a variety of data analysis applications and datasets.

SUMMARY

The present disclosure describes techniques used in systems, methods, and in computer program products for semantic layer generation, which techniques advance the relevant technologies to address technological issues with legacy approaches. More specifically, the present disclosure describes techniques used in systems, methods, and in computer program products for generation of semantic layers from the data analysis configurations of multiple data analysis applications. Certain embodiments are directed to technological solutions for generating the semantic model metadata of a semantic layer from the data analysis attributes associated with data analysis configurations rather than from subject dataset metadata associated with the subject datasets to be analyzed.

The disclosed embodiments modify and improve over legacy approaches. In particular, the herein-disclosed techniques provide technical solutions that address the technical problems attendant to reducing the computing resources consumed when developing and deploying semantic layers for a variety of data analysis applications and datasets. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of data modeling as well as advances in various technical fields related to distributed database systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
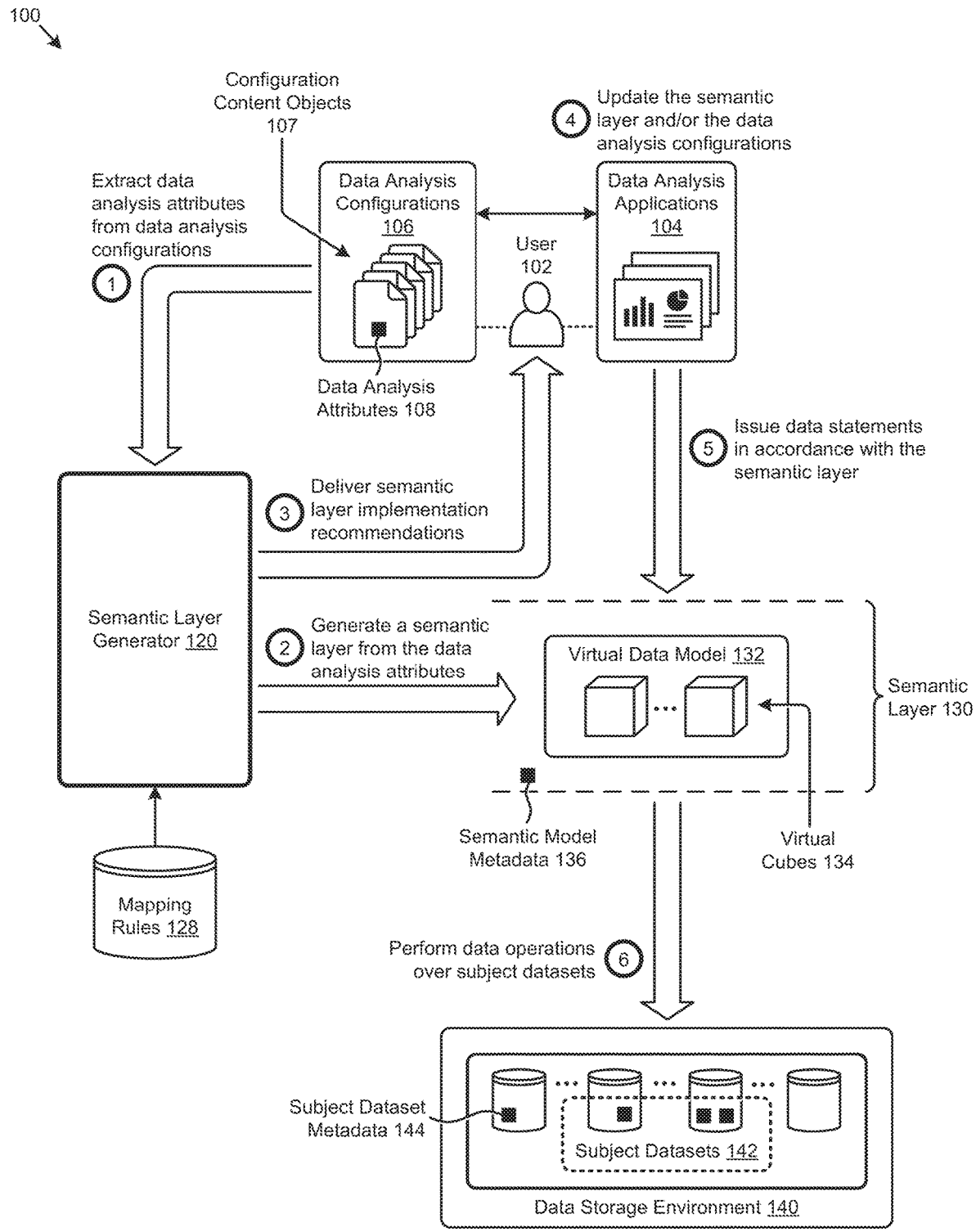
FIG. 1 illustrates a computing environment in which embodiments of the present disclosure can be implemented.

Embodiments in accordance with the present disclosure address the problem of reducing the computing resources consumed when developing and deploying semantic layers for a variety of data analysis applications and datasets. Some embodiments are directed to approaches for generating the semantic model metadata of a semantic layer from the data analysis attributes associated with data analysis configurations rather than from subject dataset metadata associated with the subject datasets to be analyzed. The accompanying figures and discussions herein present example environments, systems, methods, and computer program products for generation of semantic layers from the data analysis configurations of multiple data analysis applications.

OVERVIEW

Disclosed herein are techniques for generating the semantic model metadata of a semantic layer from the data analysis attributes associated with data analysis configurations. In certain embodiments, one or more data analysis configurations that are associated with various data analysis applications (e.g., BI applications) are identified. Such data analysis configurations might be codified in configuration content objects (e.g., data analysis files) that are accessed by the data analysis applications to perform certain analyses over a subject dataset in accordance with the data analysis configurations. The attributes of such data analysis configurations are extracted from the configuration content objects. A set of rules are accessed to facilitate mapping of the data analysis attributes to a set of semantic model metadata that define a semantic layer. Certain portions of the semantic layer and/or the configuration content objects may be modified to use the semantic layer for execution of data statements issued from the data analysis applications. In certain embodiments, one or more virtual data models are created—based at least in part on the semantic model metadata—to facilitate execution of the data statements. In certain embodiments, one or more recommendations associated with implementing the semantic layer are processed for presentation to a user. In certain embodiments, one or more of the recommendations are automatically implemented based at least in part on an event invoked by the user at a user interface.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to generating the semantic model metadata of a semantic layer from the data analysis attributes associated with data analysis configurations rather than from subject dataset metadata associated with the subject datasets to be analyzed. Specifically, the figure presents a logical depiction of how the herein disclosed techniques can be used in a computing environment to generate semantic layers from the data analysis configurations of data analysis applications.

The logical depiction of FIG. 1 illustrates a representative user (e.g., user 102) that interacts with one or more data analysis applications 104 to perform various analyses over a set of subject datasets 142 that are stored in a data storage environment 140 and described at least in part by subject dataset metadata 144. The data analysis applications 104 (e.g., Tableau, Excel, QlikSense, Power BI, Business Objects, Cognos, etc.) might be the set of data analysis applications that user 102 interacts with in the course of his or her daily work. For example, user 102 might use a first data analysis application to develop daily sales reports from a delimited flat file dataset in subject datasets 142, and a second data analysis application to generate quarterly financial reports from a legacy relational database in subject datasets 142. Some or all of the data analysis applications 104 might access a set of data analysis configurations 106 to facilitate such analyses of the subject dataset 142.

As used in one or more of the herein disclosed embodiments, a data analysis configuration is a collection of information that is accessed to facilitate certain data analyses over a respective set of one or more subject datasets. In some embodiments, a particular data analysis configuration might define referenced data sources (e.g., databases, data tables, data models, etc.), data fields (e.g., column names, etc.), calculations, associations (e.g., drill paths, etc.), data visualizations, and/or other information characterizing one or more analysis environments pertaining to the subject datasets. In some embodiments, a data analysis configuration comprises information that is different from the information codified in the subject dataset metadata associated with the subject datasets. Specifically, a data analysis configuration can comprise information that is interpreted by one or more data analysis applications to analyze one or more subject datasets, whereas the subject dataset metadata comprises information that merely characterizes the subject datasets without consideration of any particular data analysis application. For example, a data analysis configuration from data analysis configurations 106 might describe a data model that is used by one or more of the data analysis applications 104 to analyze a particular dataset from subject datasets 142, whereas the subject dataset metadata 144 merely describes certain attributes (e.g., database definition, schema definition, etc.) of the dataset.

The information that comprises the data analysis configurations 106 is described in a set (or sets) of data analysis attributes 108 that are stored and/or organized in one or more configuration content objects 107. One or more configuration content objects might correspond to one or more data analysis configurations. Such configuration content objects are often computer-readable objects (e.g., text files, workbooks, databases, data tables, programming code files, etc.) that are accessed by the data analysis applications 104 to facilitate data analyses in accordance with the data analysis configuration(s) corresponding to the configuration content objects. As an example, a configuration content object might be a workbook file that is accessed by a data analysis application to present certain data views (e.g., worksheets, dashboards, etc.) that are configured to perform analyses over a particular data source (e.g., dataset, database, data table, data model, etc.). Many content object types and/or structures of the configuration content objects are possible. For example, the data analysis attributes of a data analysis configuration might be codified in a collection of data records that comprise a list of historical and/or planned queries, or a sequence of communications over an application programming interface (API).

As earlier mentioned, implementation of a semantic layer might be desired to, in part, present logical views of subject datasets 142 that abstract the complexities of the datasets to make it easier for user 102 to analyze subject datasets 142. For example, a semantic layer might comprise multidimensional data models that facilitate translation of data statements written in familiar business terms to complex data operations that are executed over subject datasets 142. However, developing and implementing a semantic layer in computing environment 100, which has many different data analysis applications (e.g., data analysis applications 104) and over many different datasets (e.g., within subject datasets 142), presents several challenges.

The herein disclosed techniques address such challenges by implementing a semantic layer generator 120 to generate the semantic model metadata of a semantic layer 130 from the data analysis attributes 108 associated with data analysis applications 104. As shown, the data analysis attributes 108 that describe the data analysis configurations 106 are extracted by the semantic layer generator 120 (operation 1). The data analysis attributes 108 are mapped to a set of semantic model metadata 136 that define the semantic layer 130 (operation 2). In some cases, a set of mapping rules 128 are accessed to facilitate the mapping of the data analysis attributes 108 to the semantic model metadata 136.

As can be observed, semantic layer 130 can be represented by a virtual data model 132. The virtual data model 132 might in turn comprise various data model attributes that are used to form one or more logical representations (e.g., virtual cubes 134) of the subject datasets 142. The virtual data model 132 is herein characterized as "virtual"

since the model is an abstracted logical representation of the structures of the underlying subject datasets. For example, virtual data model 132 can represent a subject delimited flat file as a multidimensional data cube to facilitate various analyses of the flat file dataset by user 102 at data analysis applications 104.

Furthermore, in exemplary embodiments, the semantic layer generator 120 delivers various recommendations pertaining to implementation of the semantic layer 130 (operation 3). Such implementation recommendations might provide instructions to user 102 for use of the newly generated semantic layer. For example, the implementation recommendations might describe how to refine, publish and reference one or more of the virtual cubes 134 associated with semantic layer 130. In this case, one or more updates to the semantic layer 130 (e.g., change and publish one of the virtual cubes 134) and/or one or more updates to the data analysis configurations 106 (e.g., change a data source reference) might be performed so as to prepare the semantic layer 130 for use (operation 4). One or more data statements can then be issued from the data analysis applications 104 in accordance with the semantic layer 130 (operation 5). As an example, such data statements might be configured to operate on one or more of the virtual cubes 134 of semantic layer 130. In response to the data statements, various data operations are performed over the subject datasets 142 (operation 6).

Further details regarding general approaches to interpreting data statements using virtual data models are described in U.S. Pat. No. 9,600,554 titled "INTERPRETING RELATIONAL DATABASE STATEMENTS USING A VIRTUAL MULTIDIMENSIONAL DATA MODEL", which is hereby incorporated by reference in its entirety.

The herein disclosed techniques reduce the computing resources consumed when developing and implementing semantic layers (e.g., semantic layer 130) for a variety of data analysis applications (e.g., data analysis applications 104) and datasets (e.g., subject datasets 142). As such, application of the techniques disclosed herein facilitate improvements in computer functionality that serve to reduce the demand for computer memory, reduce the demand for computer processing power, reduce network bandwidth use, and reduce the demand for inter-component communication. Specifically, consumption of such computing resources to develop and implement an instance of a semantic layer for each combination of data analysis applications and datasets is greatly reduced. Furthermore, the computing resources consumed to update multiple semantic layers in response to changes to the underlying datasets and/or changes to the analytics (e.g., as defined by the data analysis configurations) to be performed over the datasets is also reduced. Many of the semantic layer implementation recommendations delivered by the herein disclosed techniques further reduce the consumption of computing resources by improving the efficiency of the generated semantic layers. As an example, the consumption of computing resources associated with managing data analysis attributes that are not used by the corresponding data views can be eliminated by taking action on an implementation recommendation that identifies such unused attributes and that provides a mechanism to remove the unused attributes from the semantic layer.

One embodiment of techniques for generating semantic layers according to the foregoing technological solutions is disclosed in further detail as follows.

Figure 2:
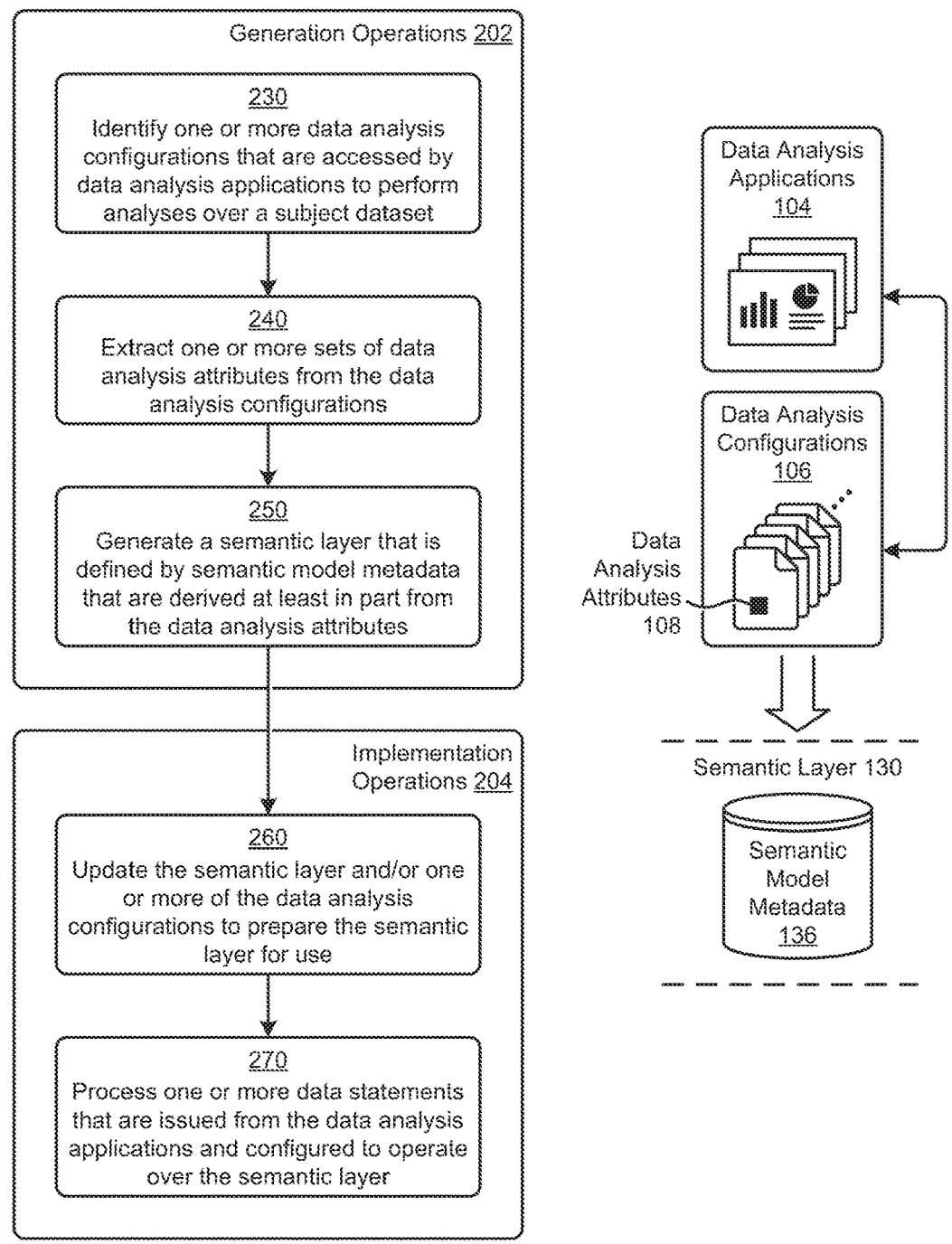
FIG. 2 presents a semantic layer generation technique as implemented in systems that support generation of semantic layers from the data analysis configurations of multiple data analysis applications, according to an embodiment.

FIG. 2 presents a semantic layer generation technique 200 as implemented in systems that support generation of semantic layers from the data analysis configurations of multiple data analysis applications. As an option, one or more variations of semantic layer generation technique 200 or any aspect thereof may be implemented in the context of the architecture and functionality of the embodiments described herein. The semantic layer generation technique 200 or any aspect thereof may be implemented in any environment.

The semantic layer generation technique 200 shown in FIG. 2 presents one embodiment of certain steps and/or operations that facilitate generating the semantic model metadata of a semantic layer from the data analysis attributes associated with data analysis configurations rather than from subject dataset metadata associated with the subject datasets to be analyzed. As shown, such steps and/or operations can constitute a set of generation operations 202 for generating the semantic model, and a set of implementation operations 204 for using the semantic model.

The generation operations 202 of the semantic layer generation technique 200 can commence by identifying one or more data analysis configurations that are accessed by a set of respective data analysis applications to perform analyses over subject datasets (step 230). For example, and as illustrated, the data analysis configurations 106 that are associated with the data analysis applications 104 earlier described might be identified. One or more sets of data analysis attributes (e.g., data analysis attributes 108) associated with the data analysis configurations are determined (step 240). A semantic layer defined by a set of semantic model metadata is generated based at least in part on the data analysis attributes (step 250). As can be observed in the illustrated example of FIG. 2, the semantic layer 130 defined by the semantic model metadata 136 is generated at least in part from the data analysis attributes 108 of the data analysis configurations 106.

The implementation operations 204 of the semantic layer generation technique 200 can commence by updating the semantic layer and/or one or more of the data analysis configurations to prepare the semantic layer for use (step 260). For example, one or more updates to the semantic layer 130 (e.g., change and publish a virtual cube) and/or one or more updates to the data analysis configurations 106 (e.g., change a data source reference) might be performed so as to prepare the semantic layer 130 for use. Use of the semantic layer can include processing data statements that are issued from the data analysis applications (e.g., data analysis applications 104) and configured to operate over the semantic layer (e.g., semantic layer 130) (step 270).

One embodiment of a system for implementing the semantic layer generation technique 200 and/or other herein disclosed techniques is disclosed as follows.

Figure 3:
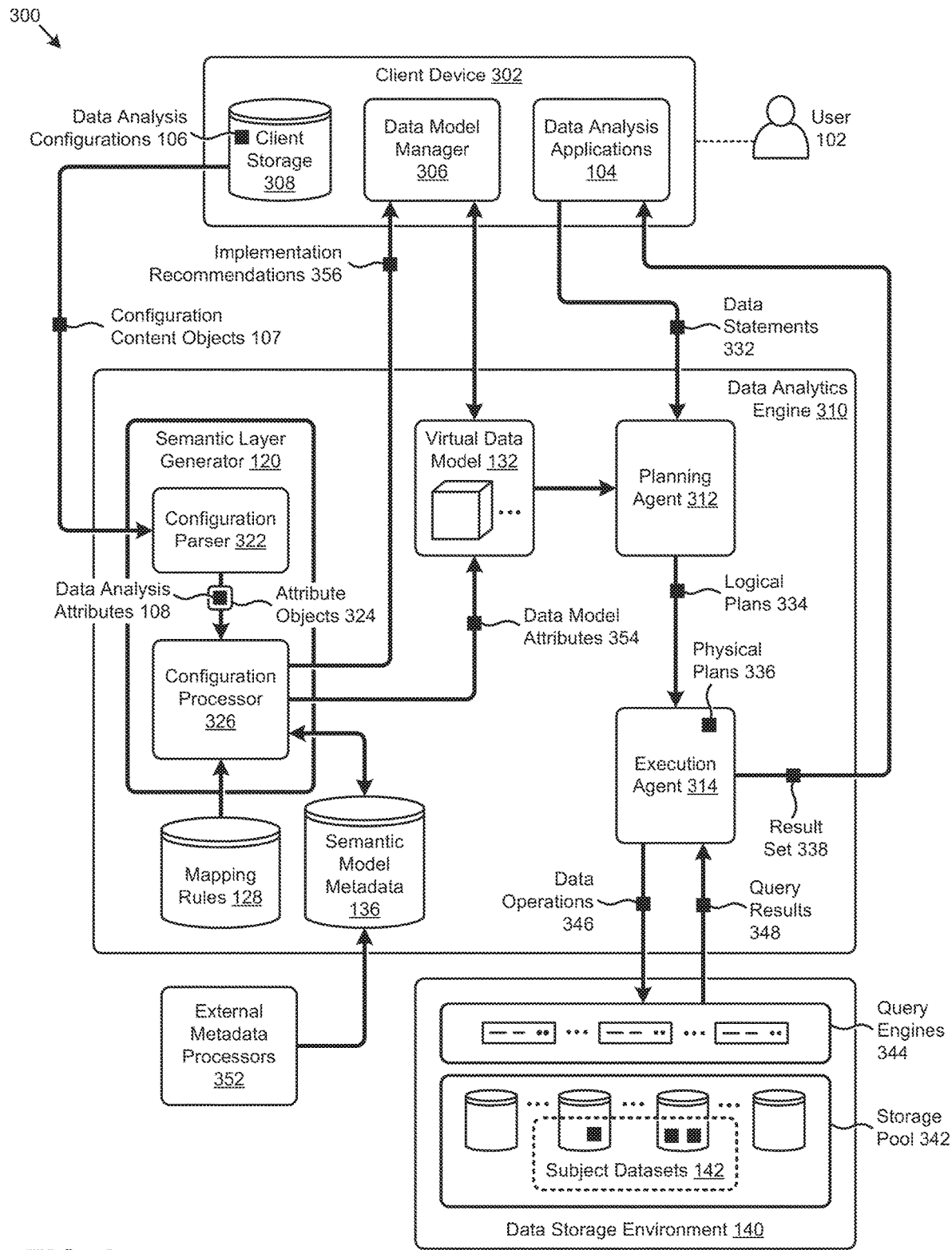
FIG. 3 depicts a computing system for supporting generation of semantic layers from the data analysis configurations of multiple data analysis applications, according to an embodiment.

FIG. 3 depicts a computing system 300 for supporting generation of semantic layers from the data analysis configurations of multiple data analysis applications. As an option, one or more variations of computing system 300 or any aspect thereof may be implemented in the context of the architecture and functionality of the embodiments described herein. The computing system 300 or any aspect thereof may be implemented in any environment.

FIG. 3 illustrates one aspect pertaining to generating the semantic model metadata of a semantic layer from the data analysis attributes associated with data analysis configurations rather than from subject dataset metadata associated with the subject datasets to be analyzed. Specifically, the figure is being presented to show one embodiment of certain representative components, data structures, and associated data flows that describe how the herein disclosed techniques might be implemented in a modern computing system. The components, data structures, and data flows shown in FIG. 3 present one partitioning and associated data manipulation approach. The specific example shown is purely exemplary, and other subsystems, data structures, and/or partitioning are reasonable.

As shown in the embodiment of FIG. 3, the computing system 300 comprises an instance of the semantic layer generator 120 operating at a data analytics engine 310. A configuration parser 322 at semantic layer generator 120 receives the configuration content objects 107 that describe the data analysis configurations 106 stored in a storage facility (e.g., client storage 308) of a client device 302. As an example, user 102 might interact with a user interface presented at client device 302 to select the configuration content objects 107 (e.g., workbook files) to be received at configuration parser 322. The configuration parser 322 processes the configuration content objects 107 to extract a set of data analysis attributes 108 that characterize the data analysis configurations 106. The data analysis attributes 108 are delivered to a configuration processor 326 at semantic layer generator 120 in a set of attribute objects 324.

The configuration processor 326 maps the data analysis attributes 108 that comprise the attribute objects 324 to a set of semantic model metadata 136. A set of mapping rules 128 might be consulted to facilitate the mapping of the data analysis attributes 108 to the semantic model metadata 136. For example, the mapping rules 128 might perform a different mapping of attributes based at least in part on the content object type of configuration content object being processed. In some cases, the semantic model metadata 136 might be received from one or more external metadata processors 352. In some cases, some or all of the semantic model metadata 136 might be generated by one or more of the external metadata processors 352 based at least in part on information not derived from data analysis configurations 106.

The configuration processor 326 accesses the semantic model metadata 136 to create a set of data model attributes 354 that define a virtual data model 132. A set of data model attributes might comprise various dimensions, measures, relationships, hierarchies, and/or other attributes associated with a virtual data model. As earlier described, a set of semantic model metadata (e.g., semantic model metadata 136) can define a semantic layer, which in turn can be represented by a virtual data model (e.g., virtual data model 132). As such, implementation and/or use of a semantic layer that is generated by semantic layer generator 120 according to the herein disclosed techniques is facilitated at least in part by the virtual data model 132.

More specifically, a semantic layer represented by virtual data model 132 is implemented and/or used in computing system 300 by processing a set of data statements 332 that are issued from the data analysis applications 104 and configured to operate over virtual data model 132. Such data statements (e.g., data statements 332) are received at a planning agent 312 operating at the data analytics engine 310. As an example, data statements 332 might be issued to analyze one or more of the subject datasets 142 stored in a storage pool 342 at data storage environment 140. The planning agent 312 accesses the virtual data model 132 to generate one or more logical plans 334 for data statements 332.

A logical plan, such as comprising logical plans 334, is a programming code object representation of the semantics of data statements in terms of the underlying subject dataset as facilitated by the virtual data model. Specifically, the virtual data model (e.g., virtual data model 132) facilitates a mapping of the parameters of the data statements (e.g., data selection, data source, selection conditions, etc.) to respective data model attributes. For example, a data selection parameter from one or more data statements can correspond to a measure in a virtual data model, and/or can correspond to values of a dimensional attribute (e.g., the city in a geographic hierarchy or the calendar date in a time hierarchy). An execution agent 314 generates one or more physical plans 336 from the logical plans 334. A set of data operations 346 associated with the physical plans 336 are delivered by execution agent 314 for processing at a target query engine from the query engines 344. Responsive to executing the data operations, a result set 338, based at least in part on query results 348 returned by the target query engine, is delivered to the data analysis applications 104.

As shown in FIG. 3, certain aspects (e.g., data model attributes 354) of the virtual data model 132 might be presented at a data model manager 306 operating at client device 302. A user (e.g., user 102) can interact with data model manager 306 to explore and/or modify the virtual data model 132 that is associated with the semantic layer generated by the semantic layer generator 120. A set of implementation recommendations 356 as determined by the configuration processor 326 at the semantic layer generator 120 might also be presented at data model manager 306. Such recommendations might provide guidance and/or instructions to user 102 pertaining to implementation and/or use of the virtual data model 132 associated with the semantic layer. In some cases, user 102 might invoke certain action events at the data model manager 306 to carry out the guidance and/or instructions associated with a particular implementation recommendation.

The foregoing discussions describe techniques for determining the data analysis attributes of a set of data analysis configurations (e.g., step 240 of FIG. 2), which techniques are disclosed in further detail as follows.

Figure 4:
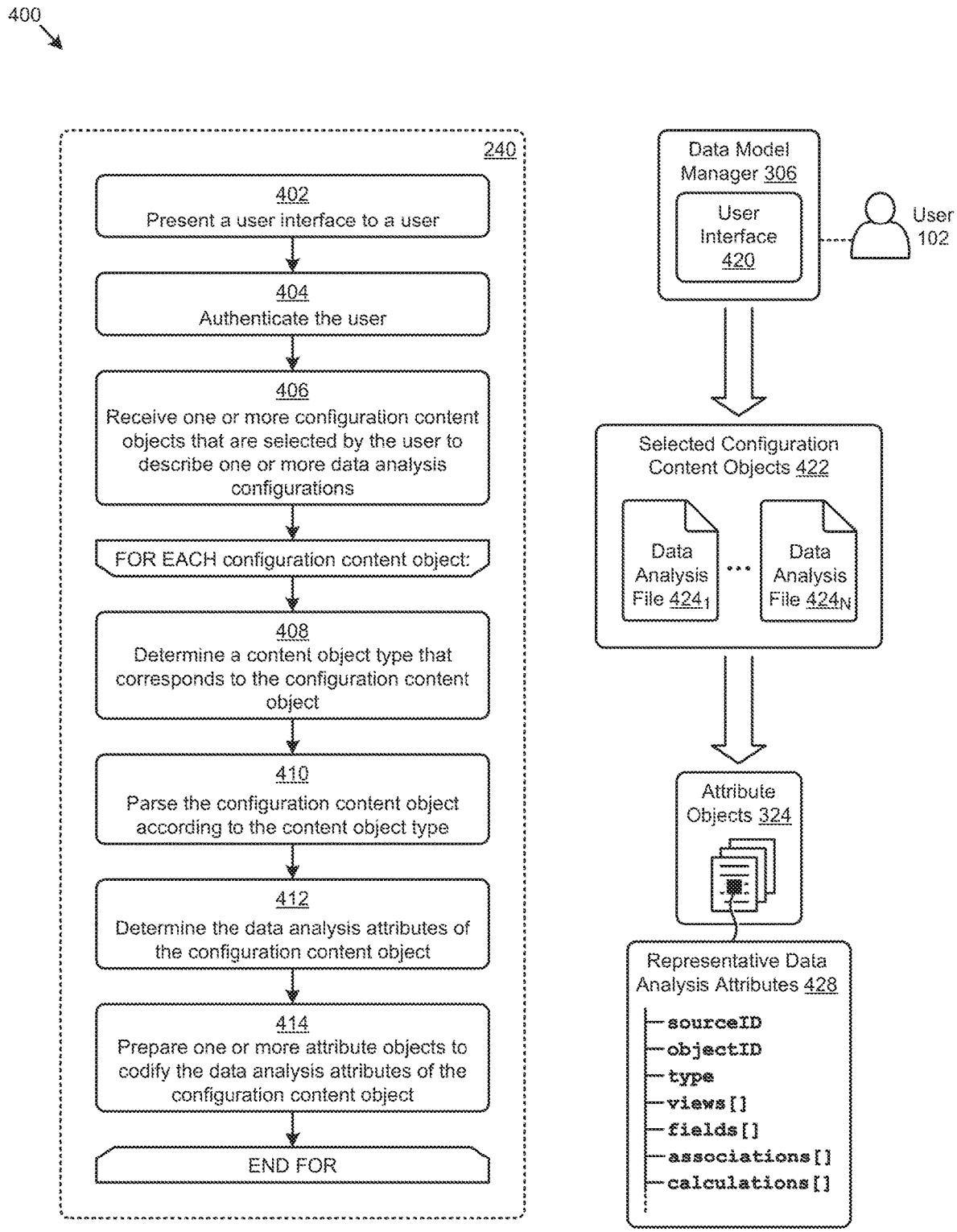
FIG. 4 depicts a data analysis attributes extraction technique as implemented in systems that support generation of semantic layers from the data analysis configurations of multiple data analysis applications, according to an embodiment.

FIG. 4 depicts a data analysis attributes extraction technique 400 as implemented in systems that support generation of semantic layers from the data analysis configurations of multiple data analysis applications. As an option, one or more variations of data analysis attributes extraction technique 400 or any aspect thereof may be implemented in the context of the architecture and functionality of the embodiments described herein. The data analysis attributes extraction technique 400 or any aspect thereof may be implemented in any environment.

FIG. 4 illustrates one aspect pertaining to generating the semantic model metadata of a semantic layer from the data analysis attributes associated with data analysis configurations rather than from subject dataset metadata associated with the subject datasets to be analyzed. Specifically, the figure is being presented to illustrate one embodiment of certain steps and/or operations for determining the data analysis attributes of a set of data analysis configurations as implemented according to the herein disclosed techniques. An example scenario that corresponds to at least some of the steps and/or operations is also presented. The figure further illustrates one embodiment of the data structures of certain data that are accessed and/or populated in conjunction with the data analysis attributes extraction technique 400 depicted in FIG. 4.

The aforementioned steps and/or operations of the data analysis attributes extraction technique 400 can commence by presenting a user interface to a user (step 402). For example, a user interface 420 associated with the data model manager 306 earlier described might be presented to user 102. The user is authenticated (step 404) so that one or more configuration content objects selected by the user can be received (step 406). As an example, user 102 might be authenticated by logging in to data model manager 306 and might interact with data model manager 306 to select certain configuration content objects that correspond to a respective set of data analysis configurations. As shown, a set of selected configuration content objects 422 (e.g., data analysis file $424_1$, . . . , data analysis file $424_N$) might be identified and selected by user 102.

For each selected configuration content object, a content object type is determined for the configuration content object (step 408). A content object type might correspond to a data analysis application provider such as Tableau (e.g., workbook files with a ".twb" file extension), MicroStrategy (e.g., dashboard files with a ".mstr" file extension), SAP (e.g., business objects query files with a ".bqy" file extension), Microsoft (e.g., SQL server analysis services scripting protocols with a ".xmla" file extension), and/or other providers. The configuration content object is parsed according to the content object type (step 410) to determine the data analysis attributes of the data analysis configuration corresponding to the configuration content object (step 412). The data analysis attributes are codified in one or more attribute objects (step 414). As can be observed, the data analysis attributes can be codified in attribute objects 324 in accordance with a set of representative data analysis attributes 428.

As depicted by the representative data analysis attributes 428, the data analysis attributes might be organized by each unique data source discovered in the data analysis configurations. Specifically, an attribute object instance (e.g., table row or programming object instance) associated with a particular data source might comprise a data source identifier (e.g., stored in a "sourceID" field), a configuration content object identifier (e.g., stored in an "objectID" field), a content object type description (e.g., stored in a "type" field), a set of views that reference the data source (e.g., stored in a "views [ ]" object), a set of field (e.g., column names) descriptions (e.g., stored in a "fields [ ]" object), a set of attribute associations (e.g., stored in an "associations [ ]" object), a set of calculations (e.g., stored in a "calculations [ ]" object), and/or other data analysis attributes.

The data and/or other information described herein can be organized and/or stored using various techniques. The data structures described herein are designed to improve the way a computer stores and retrieves data in memory when implementing the herein disclosed techniques. For example, as illustrated by the representative data analysis attributes 428, data analysis attributes might be organized and/or stored in a tabular structure (e.g., relational database table), which has rows that relate various attributes (e.g., a data source identifier, content object type, etc.) that pertain to a particular data source. As another example, the information might be organized and/or stored in a programming code object that has instances corresponding to a particular data source and properties corresponding to the various data analysis attributes associated with the data source.

The foregoing discussions describe techniques for generating semantic model metadata from a set of data analysis attributes (e.g., step 250 of FIG. 2), which techniques are disclosed in further detail as follows.

Figure 5A:
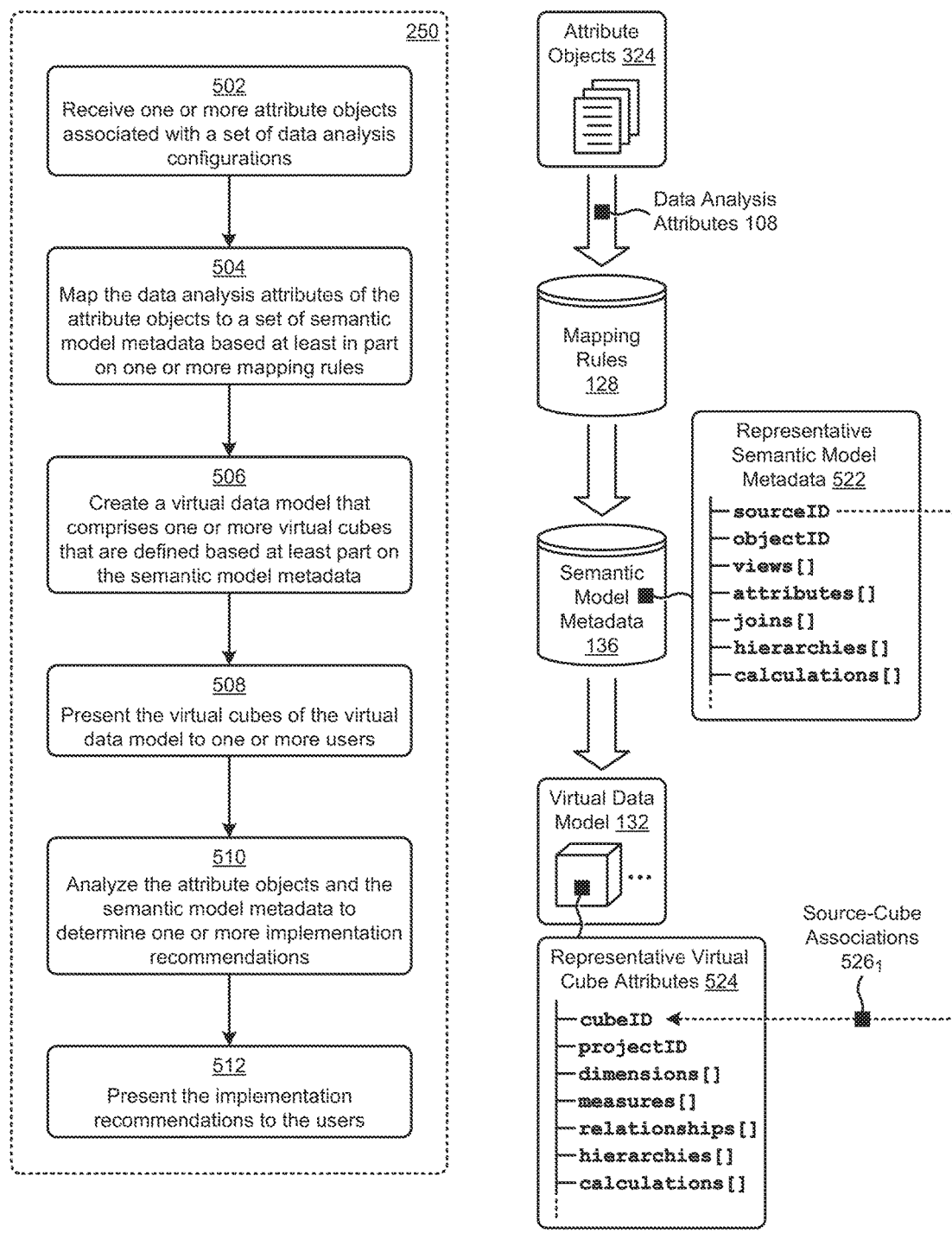
FIG. 5A depicts a semantic model metadata generation technique as implemented in systems that support generation of semantic layers from the data analysis configurations of multiple data analysis applications, according to an embodiment.

FIG. 5A depicts a semantic model metadata generation technique 5A00 as implemented in systems that support generation of semantic layers from the data analysis configurations of multiple data analysis applications. As an option, one or more variations of semantic model metadata generation technique 5A00 or any aspect thereof may be implemented in the context of the architecture and functionality of the embodiments described herein. The semantic model metadata generation technique 5A00 or any aspect thereof may be implemented in any environment.

FIG. 5A illustrates one aspect pertaining to generating the semantic model metadata of a semantic layer from the data analysis attributes associated with data analysis configurations rather than from subject dataset metadata associated with the subject datasets to be analyzed. Specifically, the figure is being presented to illustrate one embodiment of certain steps and/or operations for generating semantic model metadata from a set of data analysis attributes as implemented according to the herein disclosed techniques. An example scenario that corresponds to at least some of the steps and/or operations is also presented. The figure further illustrates one embodiment of the data structures of certain data that are accessed and/or populated in conjunction with the semantic model metadata generation technique 5A00 depicted in FIG. 5A.

The aforementioned steps and/or operations of the semantic model metadata generation technique 5A00 can commence by receiving one or more attribute objects associated with various data analysis configurations (step 502). For example, the illustrated set of attribute objects 324 prepared in accordance with the herein disclosed techniques might be received. The data analysis attributes of the attribute objects are mapped to a set of semantic model metadata based at least in part on a set of mapping rules (step 504). As shown, the data analysis attributes 108 of attribute objects 324 might be mapped to semantic model metadata 136 as specified by the mapping rules 128. The semantic model metadata can be stored and/or organized in accordance with the shown set of representative semantic model metadata 522.

The representative semantic model metadata 522 indicates a metadata record (e.g., table row or programming object instance) can comprise a data source identifier (e.g., stored in a "sourceID" field), a configuration content object identifier (e.g., stored in a "objectID" field), a set of views that reference the data source (e.g., stored in a "views [ ]" object), a set of mapped attributes (e.g., stored in an "attributes [ ]" object), a set of join relationships (e.g., stored in a "joins [ ]" object), a set of hierarchies (e.g., stored in a "hierarchies [ ]" object), a set of calculations (e.g., stored in a "calculations [ ]" object), and/or other semantic model metadata information. The foregoing mapped attributes (e.g., stored in an "attributes [ ]" object) are the fine-grained data (e.g., "atoms" of data) such as dimensions or measures, that are extracted from the data analysis attributes. The join relationships and/or hierarchies describe how these attributes are related (e.g., A equals B, A determines B, A is related in some other way to B, etc.). In some cases, such join relationships and/or hierarchies might not be explicitly defined in the data analysis attributes (e.g., attribute associations), but rather might be determined by the herein disclosed techniques in the mapping process of the semantic model metadata generation technique 5A00. For example, data analysis attributes related to date or time (e.g., "saleMonth", "saleDay", and "saleHour") might be mapped to a date-time hierarchy (e.g., "saleMonth" is a parent of "saleDay", which is a parent of "saleHour").

Referring to the steps and/or operations of the semantic model metadata generation technique 5A00, a virtual data model is created that comprises one or more virtual cubes that are defined based at least in part on the semantic model metadata (step 506). As can be observed, the virtual data model 132 earlier described might be created from the semantic model metadata 136. As indicated in a set of representative virtual cube attributes 524, the virtual cubes that comprise the virtual data model 132 can be described by a cube identifier (e.g., stored in a "cube ID" field), a project identifier (e.g., stored in a "projectID" field), a set of dimensions (e.g., stored in a "dimensions [ ]" object), a set of measures (e.g., stored in a "measures [ ]" object), a set of relationships (e.g., stored in a "relationships [ ]" object), a set of hierarchies (e.g., stored in a "hierarchies [ ]" object), a set of calculations (e.g., stored in a "calculations [ ]" object), and/or other attributes. As can be observed by the source-cube associations $526_1$, a particular virtual cube (e.g., as identified in the "cubeID" field) might correspond to a particular data source (e.g., as identified in the "sourceID" field) that is represented in the semantic model metadata 136. Some portions (e.g., one or more of the hierarchies) of the semantic model metadata 136 might transfer to the virtual data model 132 without modification, while other portions (e.g., one or more of the calculations) of the semantic model metadata 136 might be modified before transferring to the virtual data model 132.

The virtual cubes of the virtual data model created from the semantic model metadata are presented to one or more users (step 508). Such users might interact with the presented view of the virtual cubes to manage (e.g., explore, modify, refine, etc.) the virtual cubes and the overall virtual data model. The attribute objects and/or the semantic model metadata are also analyzed to determine one or more implementation recommendations (step 510) which are presented to the users (step 512). Such implementation recommendations might provide (e.g., to the users) certain instructions that pertain to implementation and use of a semantic layer that is based at least in part on the semantic model metadata.

The foregoing discussions describe techniques for creating a virtual data model from data analysis attributes associated with a set of data analysis files, which techniques are disclosed in further detail as follows.

Figure 5B:
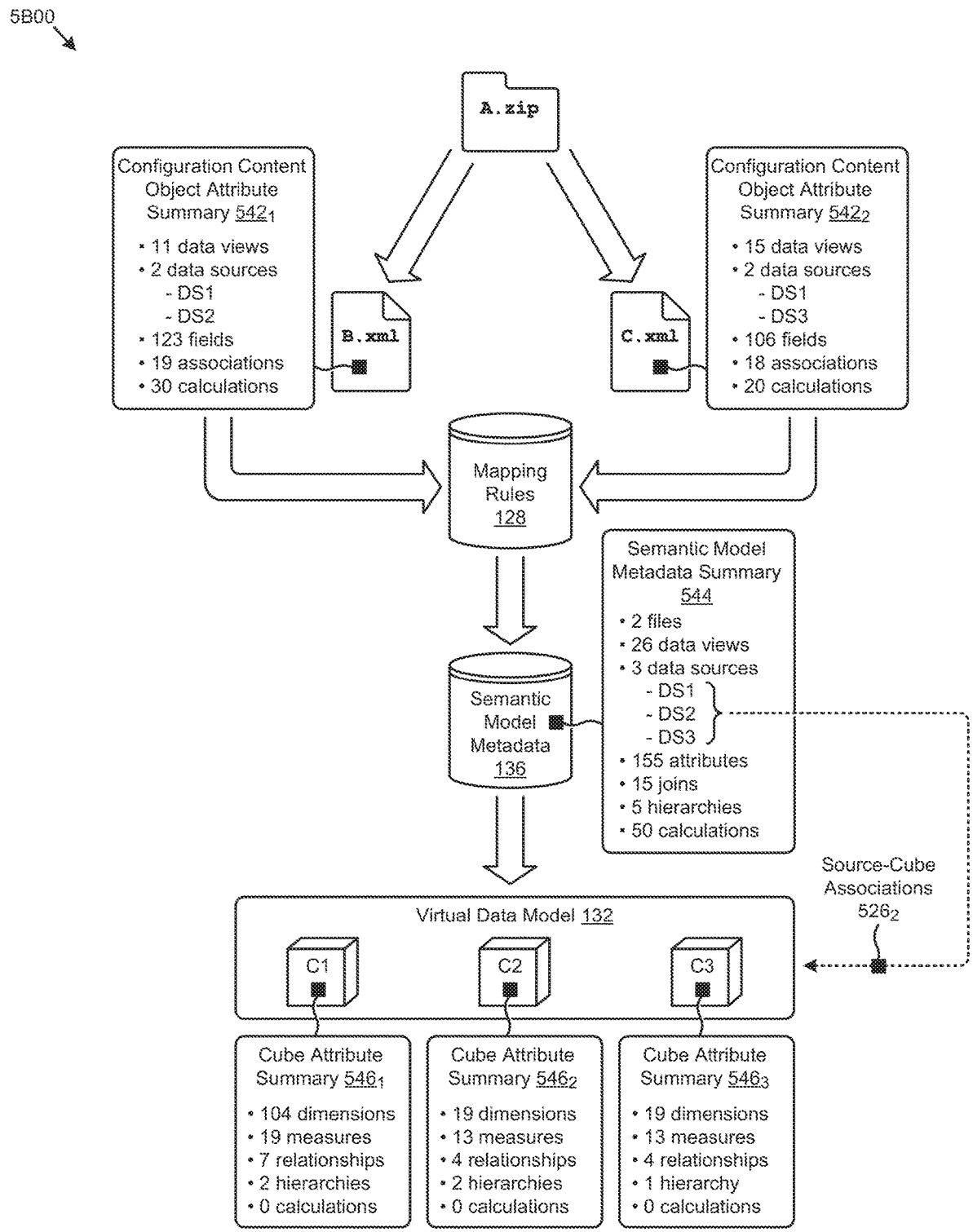
FIG. 5B illustrates a virtual data model generation scenario as implemented in systems that support generation of semantic layers from the data analysis configurations of multiple data analysis applications, according to an embodiment.

FIG. 5B illustrates a virtual data model generation scenario 5B00 as implemented in systems that support generation of semantic layers from the data analysis configurations of multiple data analysis applications. As an option, one or more variations of virtual data model generation scenario 5B00 or any aspect thereof may be implemented in the context of the architecture and functionality of the embodiments described herein. The virtual data model generation scenario 5B00 or any aspect thereof may be implemented in any environment.

FIG. 5B illustrates one aspect pertaining to generating the semantic model metadata of a semantic layer from the data analysis attributes associated with data analysis configurations rather than from subject dataset metadata associated with the subject datasets to be analyzed. Specifically, the figure is presented to illustrate, using information summaries, the data that are processed when creating a virtual data model of a semantic layer from the data analysis attributes of a set of data analysis configurations, according to the herein disclosed techniques.

As shown in the virtual data model generation scenario 5B00, a zip file (e.g., "A.zip") that comprises two configuration content objects (e.g., data analysis file "B.xml" and data analysis file "c.xml") is identified for processing. The configuration content objects comprising zip file "A.zip" might correspond to one or more data analysis configurations. Various attributes described in a configuration content object attribute summary $542_1$ and a configuration content object attribute summary $542_2$ are extracted from the data analysis file "B.xml" and the data analysis file "c.xml", respectively. The attributes indicated in the configuration content object attribute summaries are applied to the mapping rules 128 to determine the semantic model metadata 136. A semantic model metadata summary 544 summarizes the content of the semantic model metadata 136. In many cases, and as indicated in the foregoing summaries, the configuration content object attributes (e.g., data analysis attributes) are mapped to a corresponding entry in the semantic model metadata 136. For example, the "11 data views" of file "B.xml" and the "15 data views" of file "c.xml" are mapped to the "26 data views" of the semantic model metadata 136.

In some cases, certain redundant information might be removed during the mapping process. For example, a data source "DS1" that is referenced by both configuration content objects is represented as one data source in the semantic model metadata 136. In some cases, certain attributes and/or aspects of the attributes may change in nature when mapped to the semantic model metadata 136. For example, "19 associations" of file "B.xml" and "18 associations" of file "c.xml" are mapped to "15 joins" and "5 hierarchies" in the semantic model metadata 136. In other cases, certain attributes and/or aspects of the attributes may not be mapped to the semantic model metadata 136. For example, the 229 fields described in the "123 fields" of file "B.xml" and the "106 fields" of file "c.xml" are mapped to merely "155 attributes" of the semantic model metadata 136. The reduced number of attributes in the semantic model metadata 136 might be a result of having calculations that are to remain specified in the configuration content objects of the data analysis configurations. In such cases, user intervention may be requested to establish calculations in the semantic model metadata.

The herein disclosed techniques are used to create the virtual data model 132 based at least in part on the semantic model metadata 136. As indicated by source-cube associations $526_2$, the virtual data model 132 can comprise a collection of virtual cubes (e.g., cube "C1", cube "C2", and cube "C3") that each corresponds to a respective data source (e.g., data source "DS1", data source "DS2", and data source "DS3") derived from the data analysis files. In some cases, multiple data sources can be merged into a single virtual cube.

A set of cube attributes summaries (e.g., cube attribute summary $546_1$, cube attribute summary $546_2$, and cube attribute summary $546_3$) describe a summary of the virtual cube attributes associated with the virtual cubes. As can be observed, all of the virtual cubes comprise at least a set of dimensions, measures, relationships, hierarchies, and calculations that are derived from the semantic model metadata 136. In some cases, certain portions of the semantic model metadata 136 may not be translated to the virtual cube attributes of the virtual data model 132. For example, a first portion (e.g., the data view attributes) of the semantic model metadata 136 might be used to generate the aforementioned implementation recommendations rather than used to create the virtual data model 132. As another example, a second portion (e.g., the calculations) of the semantic model metadata 136 might not be initially included in the virtual data model 132, but later included in response to certain user action events.

The following table is presented to further illustrate the process of creating a virtual data model of a semantic layer from the data analysis attributes of a set of data analysis configurations in accordance with the herein disclosed techniques. Specifically, Table 1 presents selected examples of the mapping of data analysis attributes to the semantic model metadata and/or virtual cube attributes associated with a semantic layer that is generated in accordance with the semantic model metadata generation technique 5A00 and/or other herein disclosed techniques. The examples shown are selected merely to highlight certain aspects of such techniques, and other examples and/or other aspects are possible. Furthermore, the examples are presented as semi-structured pseudo code for illustrative purposes, and other structures and/or formats (e.g., JSON, XML, etc.) for storing and/or organizing such information are possible.

As shown in line 1 of Table 1, one or more data analysis attributes that identify certain fields (e.g., "sum (col1)", "col2", "col3", and "col4") of tabular data sources (e.g., "table1" and "table2") can be mapped to a virtual cube (e.g., "cube1") in a semantic layer that is defined at least in part by the shown "dimensions" and "measures". Line 2 of Table 1 illustrates how a set of "associations" are mapped to a set of "hierarchies". In line 3, a set of nested attribute relationships in the "associations" object associated with the data analysis attributes are reorganized in a set of "dimensions" (e.g., comprising an embedded dimension) of a semantic layer.

TABLE 1

Example data analysis attribute mapping scenarios

| Line | Data Analysis Attributes | Semantic Layer |
|---|---|---|
| 1 | sourceID:<br>  \|<br>  \|- table1<br>fields:<br>  \|<br>  \|- sum(col1)<br>  \|- col2<br>sourceID:<br>  \|<br>  \|- table2<br>fields:<br>  \|<br>  \|- col3<br>  \|- col4 | cubeID:<br>  \|<br>  \|- cube1<br>dimensions:<br>  \|<br>  \|- dimension1<br>  \|  \|<br>  \|  \|- attribute2<br>  \|  \|- attribute3<br>  \|<br>  \|- dimension2<br>  \|  \|<br>  \|  \|- attribute1<br>measures:<br>  \|<br>  \|- measure1 |
| 2 | sourceID:<br>  \|<br>  \|- source1<br>fields:<br>  \|<br>  \|- attribute1<br>  \|- attribute2<br>  \|- attribute3<br>associations:<br>  \|<br>  \|- attribute1<br>  \|  \|<br>  \|  \|- attribute2<br>  \|<br>  \|- attribute2<br>    \|<br>    \|- attribute3 | cubeID:<br>  \|<br>  \|- cube1<br>hierarchies:<br>  \|<br>  \|- attribute1<br>    \|<br>    \|- attribute2<br>      \|<br>      \|- attribute3 |
| 3 | sourceID:<br>  \|<br>  \|- source2<br>associations:<br>  \|<br>  \|- table1.col1<br>    \|<br>    \|- table1.col2<br>      \|<br>      \|- table3.col3 | cubeID:<br>  \|<br>  \|- cube1<br>dimensions:<br>  \|<br>  \|- dimension1<br>  \|  \|<br>  \|  \|- attribute1<br>  \|  \|<br>  \|  \|- attribute2<br>  \|<br>  \|- dimension2<br>    \|<br>    \|- attribute3 |

The foregoing discussions describe techniques for presenting implementation recommendations to one or more users, which techniques are disclosed in further detail as follows.

Figure 5C:
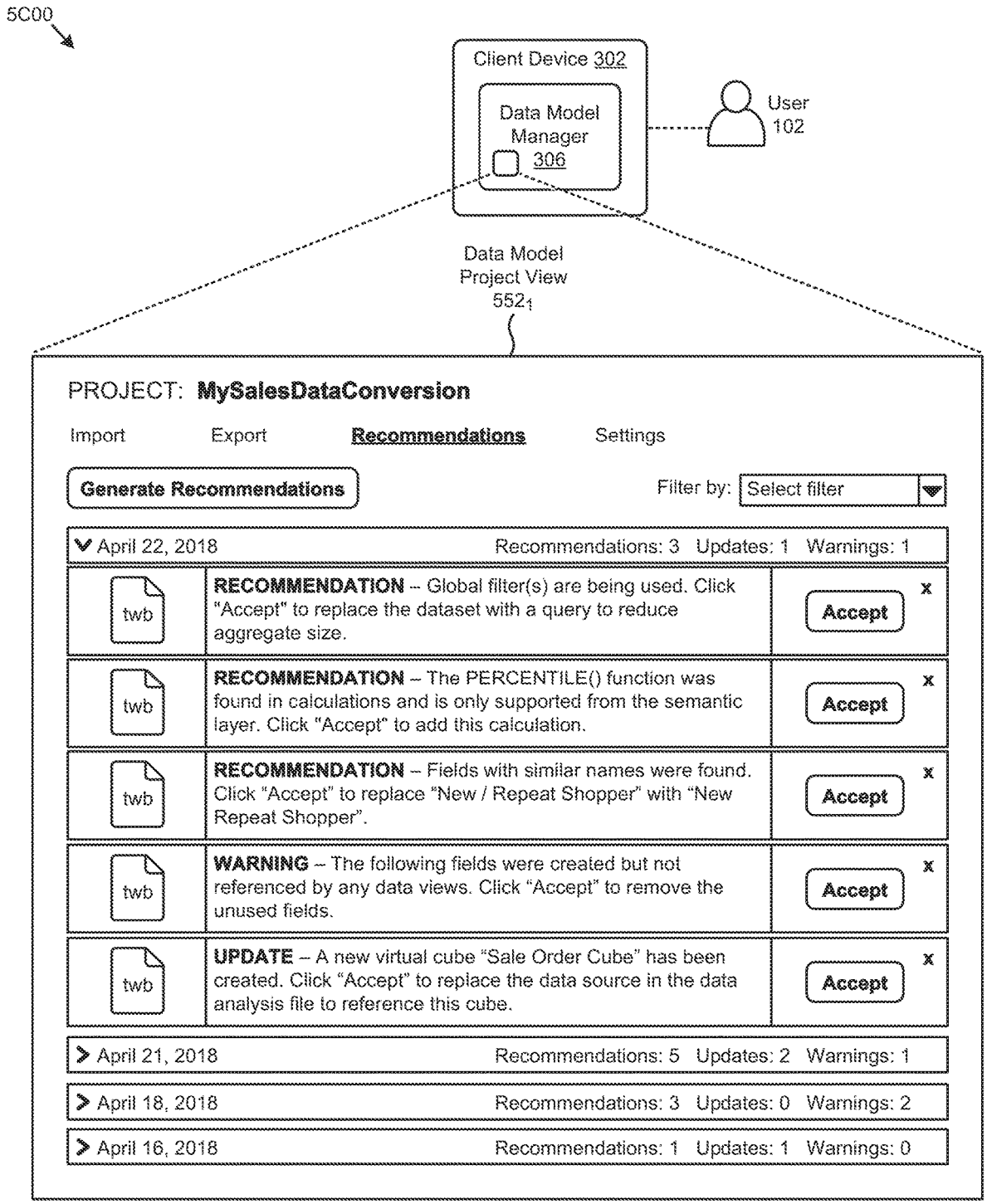
FIG. 5C illustrates a recommendation presentation scenario as implemented in systems that support generation of semantic layers from the data analysis configurations of multiple data analysis applications, according to an embodiment.

FIG. 5C illustrates a recommendation presentation scenario 5C00 as implemented in systems that support generation of semantic layers from the data analysis configurations of multiple data analysis applications. As an option, one or more variations of recommendation presentation scenario 5C00 or any aspect thereof may be implemented in the context of the architecture and functionality of the embodiments described herein. The recommendation presentation scenario 5C00 or any aspect thereof may be implemented in any environment.

FIG. 5C illustrates one aspect pertaining to generating the semantic model metadata of a semantic layer from the data analysis attributes associated with data analysis configurations rather than from subject dataset metadata associated with the subject datasets to be analyzed. Specifically, the figure illustrates one technique for presenting to a user a set of recommendations for implementing and using a semantic layer that is generated according to the herein disclosed techniques.

As shown, FIG. 5C depicts a data model project view $552_1$ that is rendered at the user interface of the data model manager 306 operating at the client device 302 of user 102. The data model project view $552_1$ presents the "Recommendations" information associated with a virtual data model project identified as "MySalesDataConversion". As earlier described, the recommendations shown in data model project view $552_1$ might be implementation recommendations that are generated and presented to user 102 so as to facilitate implementation of the virtual data model of a semantic layer. In some cases, a user can click a "Generate Recommendations" button to generate implementation recommendations in accordance with the herein disclosed techniques for an earlier implemented semantic layer and/or virtual data model. As shown, the implementation recommendations are organized in data model project view $552_1$ by date. Such dates may, for example, be the date that a certain configuration content object or set of configuration content objects corresponding to a set of data analysis configurations were processed (e.g., selected and imported) according to the herein disclosed techniques. A summary of a number of recommendations, a number of updates, and a number of warnings (e.g., a recommendation of a higher severity level) for each date is shown.

Any of the date-based summary bars can be selected for expansion to view the underlying recommendations and/or warnings. As shown in the expanded view of "Apr. 22, 2018", each recommendation and/or warning indicates a content object type that was analyzed, a description of the recommendation and/or update and/or warning, and an action button. The action buttons can be selected by the user to invoke certain action events that will facilitate implementation of the recommendation. For example, clicking the first "Accept" action button will replace a physical dataset definition (e.g., defined as a table) with a query dataset (e.g., defined as an SQL query) in the semantic layer to reduce the size of aggregates generated with processing data statements.

Techniques for updating data analysis configurations to implement and/or use newly generated semantic layers (e.g., step 260 of FIG. 2) are disclosed in further detail as follows.

Figure 6:
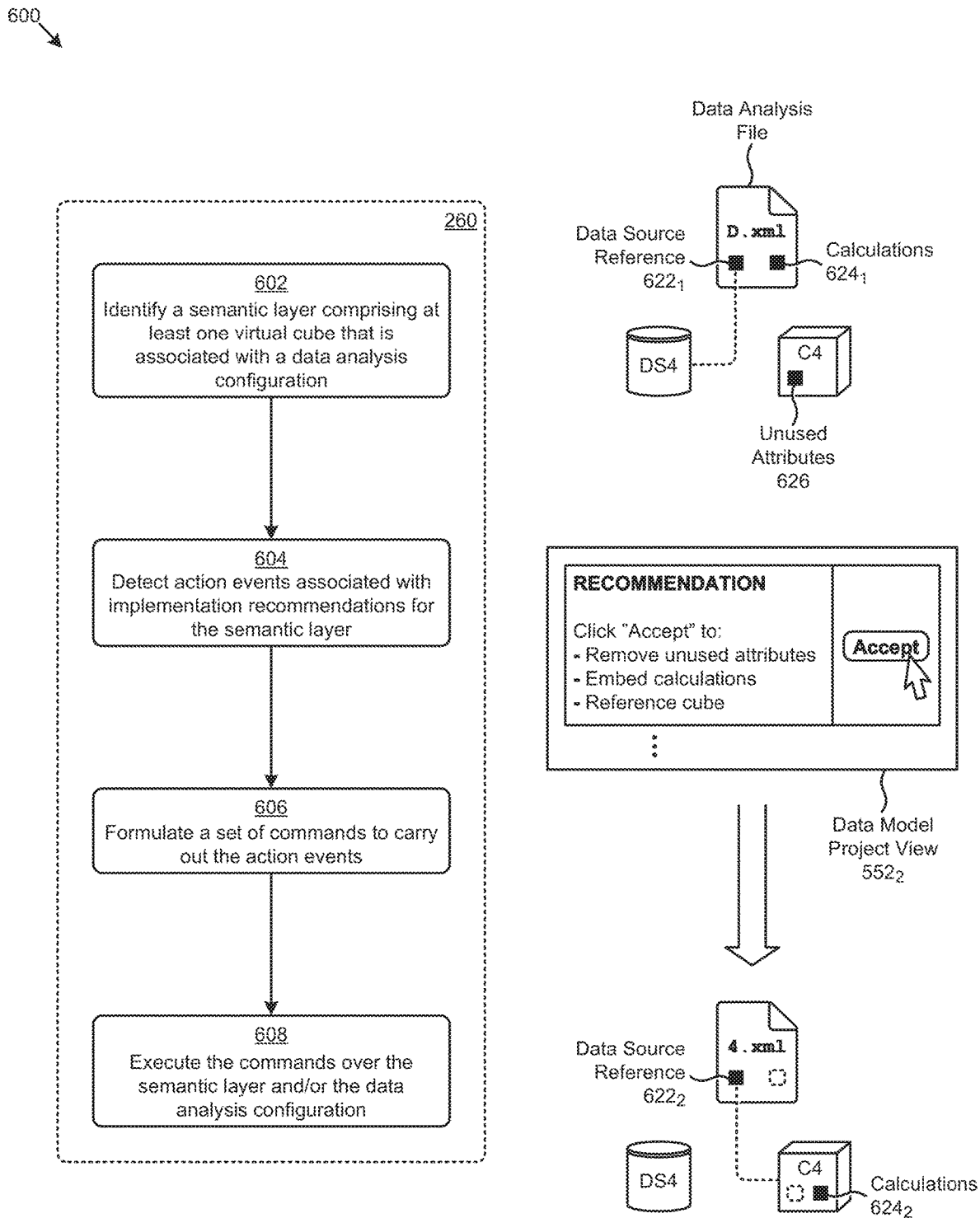
FIG. 6 depicts a data analysis configuration update technique as implemented in systems that support generation of semantic layers from the data analysis configurations of multiple data analysis applications, according to an embodiment.

FIG. 6 depicts a data analysis configuration update technique 600 as implemented in systems that support generation of semantic layers from the data analysis configurations of multiple data analysis applications. As an option, one or more variations of data analysis configuration update technique 600 or any aspect thereof may be implemented in the context of the architecture and functionality of the embodiments described herein. The data analysis configuration update technique 600 or any aspect thereof may be implemented in any environment.

FIG. 6 illustrates one aspect pertaining to generating the semantic model metadata of a semantic layer from the data analysis attributes associated with data analysis configurations rather than from subject dataset metadata associated with the subject datasets to be analyzed. Specifically, the figure is being presented to illustrate one embodiment of certain steps and/or operations for updating data analysis configurations (e.g., stored in configuration content objects) to implement and/or use semantic layers that are generated according to the herein disclosed techniques. An example scenario that corresponds to at least some of the steps and/or operations is also presented.

The aforementioned steps and/or operations of the data analysis configuration update technique 600 can commence by identifying a semantic layer comprising at least one virtual cube that is associated with a data analysis configuration (step 602). For example, a semantic layer comprising a virtual cube "C4" might be derived from a configuration content object (e.g., data analysis file "D.xml") that codifies the data analysis attributes of the data analysis configuration. In the course of generating the semantic layer according to the herein disclosed techniques, a data source "DS4" that is referenced by a data source reference $622_1$ codified in data analysis file "D.xml" is also identified. Furthermore, a set of calculations $624_1$ used by data analysis file "D.xml" are detected. Instances of unused attributes 626 comprising virtual cube "C4" are also identified.

Certain action events associated with a set of implementation recommendations for the semantic layer are detected (step 604). For example, one or more action events might be invoked by clicking an "Accept" button associated with the implementation recommendation displayed in a data model project view $552_2$. A set of commands to carry out the action events is formulated (step 606). As an example, the formulated commands might be configured to execute the implementation actions (e.g., "Remove unused attributes", "Embed calculations", and "Reference cube") associated with the implementation recommendation presented in data model project view $552_2$. In some cases, an execution order for the implementation actions is established to accommodate any prerequisite conditions for the commands. The commands are then executed (e.g., in the established order) over the semantic layer and/or the configuration content object(s) of the data analysis configuration (step 608). As can be observed in the example scenario, executing the commands corresponding to the implementation recommendation presented in data model project view $552_2$ will remove the unused attributes 626 of virtual cube "C4", embed an instance (e.g., calculations $624_2$) of the calculations from data analysis file "D.xml" in the virtual cube "C4", and change the data source reference (e.g., data source reference $622_2$) in data analysis file "D.xml" to point to the virtual cube "C4" instead of to data source "DS4".

ADDITIONAL EMBODIMENTS OF THE DISCLOSURE

Additional Practical Application Examples

Figure 7:
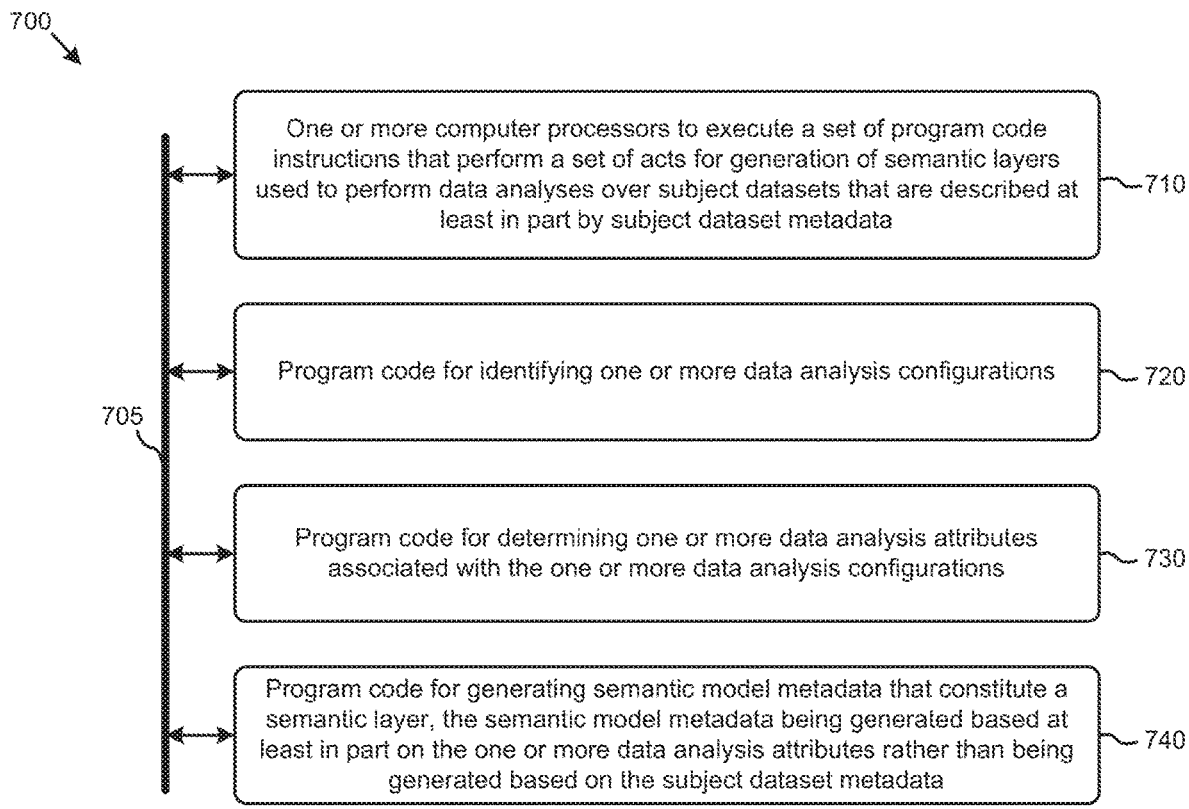
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address reducing the computing resources consumed when developing and deploying semantic layers for a variety of data analysis applications and datasets. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: identifying one or more data analysis configurations (module 720); determining one or more data analysis attributes associated with the one or more data analysis configurations (module 730); and generating semantic model metadata that constitute a semantic layer, the semantic model metadata being generated based at least in part on the one or more data analysis attributes rather than being generated based on the subject dataset metadata (module 740).

Variations of the foregoing may include more or fewer of the shown modules. Certain variations may perform more or fewer (or different) steps and/or certain variations may use data elements in more or in fewer (or different) operations.

System Architecture Overview

Additional System Architecture Examples

Figure 8A:
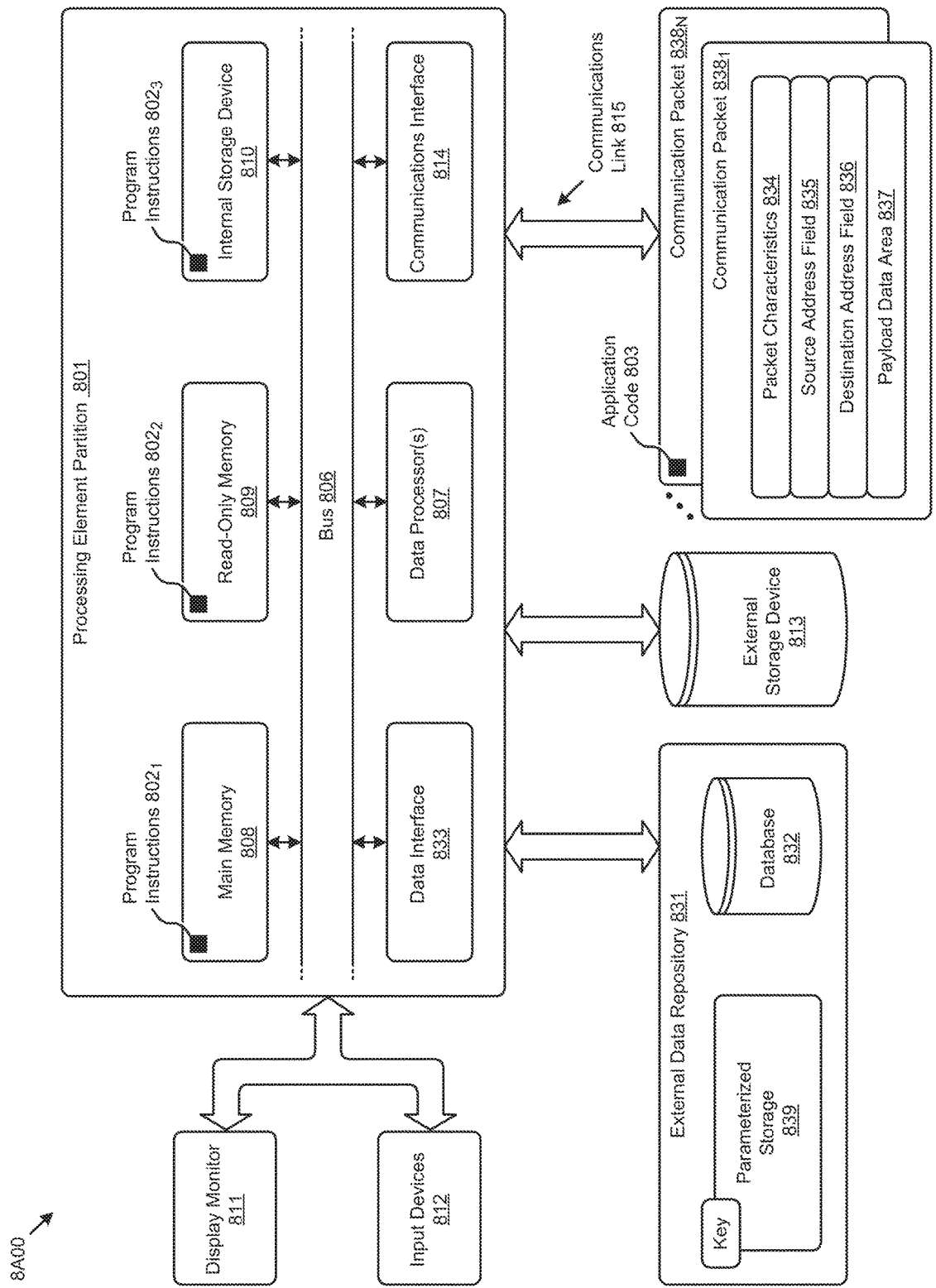
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., data processor 807), a system memory (e.g., main memory 808, or an area of random access memory (RAM)), a non-volatile storage device or non-volatile storage area (e.g., read-only memory or ROM 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communications packet $838_1$, communications packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of computer system 8A00. According to certain embodiments of the disclosure, two or more instances of computer system 8A00 coupled by a communications link 815 (e.g., LAN, PSTN, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 8B:
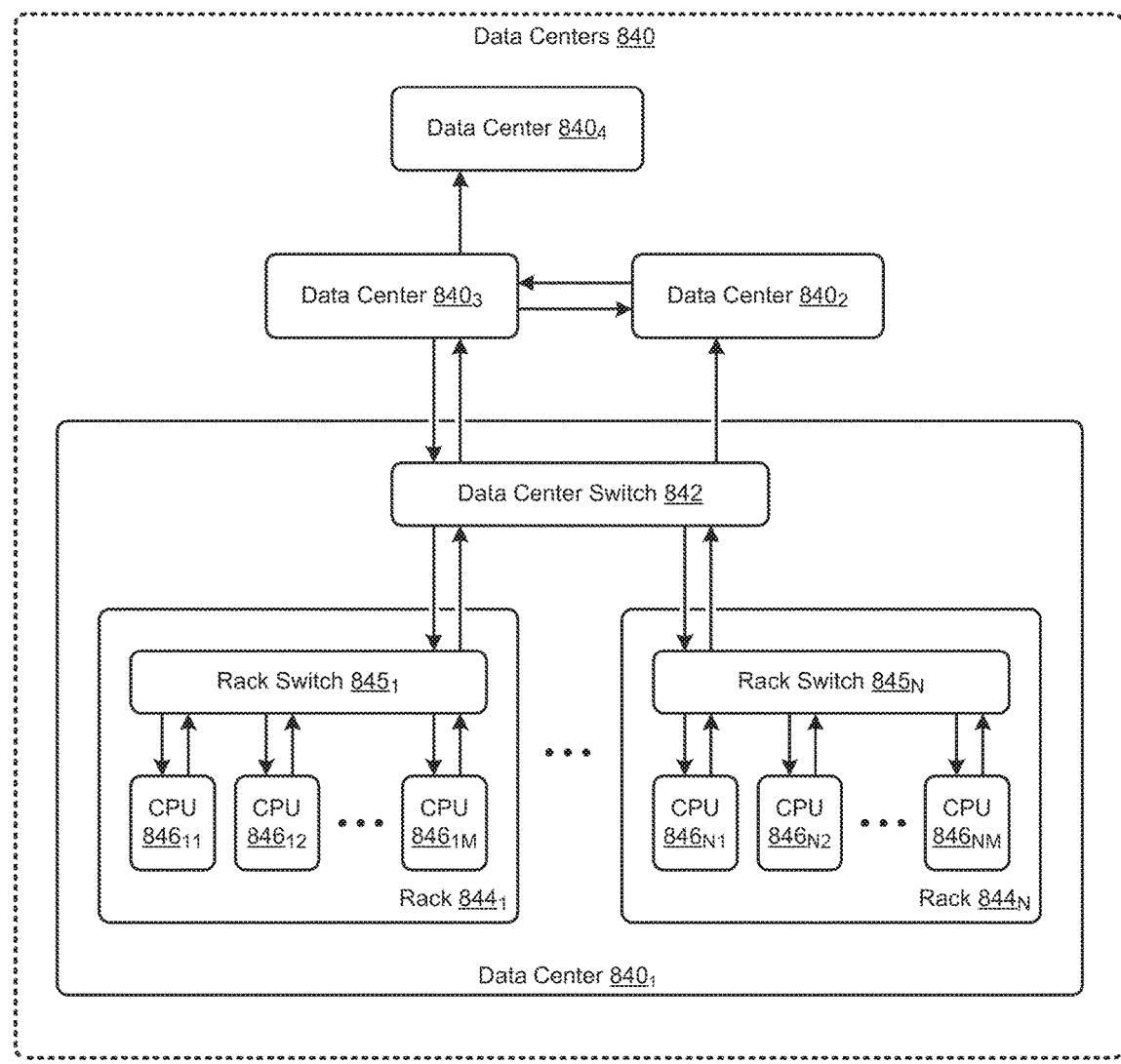

FIG. 8B depicts a block diagram of an instance of a distributed data processing system 8B00 that may be included in a system implementing instances of the herein-disclosed embodiments.

Distributed data processing system 8B00 can include many more or fewer components than those shown. Distributed data processing system 8B00 can be used to store data, perform computational tasks, and/or transmit data between a plurality of data centers 840 (e.g., data center 840$_1$, data center 840$_2$, data center 840$_3$, and data center 840$_4$). Distributed data processing system 8B00 can include any number of data centers. Some of the plurality of data centers 840 might be located geographically close to each other, while others might be located far from the other data centers.

The components of distributed data processing system 8B00 can communicate using dedicated optical links and/or other dedicated communication channels, and/or supporting hardware such as modems, bridges, routers, switches, wireless antennas, wireless towers, and/or other hardware components. In some embodiments, the component interconnections of distributed data processing system 8B00 can include one or more wide area networks (WANs), one or more local area networks (LANs), and/or any combination of the foregoing networks. In certain embodiments, the component interconnections of distributed data processing system 8B00 can comprise a private network designed and/or operated for use by a particular enterprise, company, customer, and/or other entity. In other embodiments, a public network might comprise a portion or all of the component interconnections of distributed data processing system 8B00.

In some embodiments, each data center can include multiple racks that each include frames and/or cabinets into which computing devices can be mounted. For example, as shown, data center 840$_1$ can include a plurality of racks (e.g., rack 844$_1$, . . . , rack 844$_N$), each comprising one or more computing devices. More specifically, rack 844$_1$ can include a first plurality of CPUs (e.g., CPU 846$_{11}$, CPU 846$_{12}$, . . . , CPU 846$_{1M}$), and rack 844$_N$ can include an Nth plurality of CPUs (e.g., CPU 846$_{N1}$, CPU 846$_{N2}$, . . . , CPU 846$_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 8B00. For example, such master processor control functions might pertain to scheduling, data distribution, and/or other processing operations associated with the tasks performed throughout the distributed data processing system 8B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack 844$_1$ can be interconnected by a rack switch 845$_1$. As another example, the CPUs in rack 844$_N$ can be interconnected by a rack switch 845$_N$. Further, the plurality of racks within data center 840$_1$ can be interconnected by a data center switch 842. Distributed data processing system 8B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for generation of semantic layers used to perform data analyses over subject datasets that are described at least in part by subject dataset metadata, the method performed by at least one computer, the method comprising:
   identifying a plurality of data analysis configurations defined by relational database tables;
   determining one or more data analysis attributes associated with the plurality of data analysis configurations; and
   generating semantic model metadata that constitute a semantic layer, the semantic model metadata being generated based at least in part on the one or more data analysis attributes, at least one of the one or more data analysis attributes mapped to a respective portion of the semantic model metadata based on one or more mapping rules, the data analysis attributes derived from the plurality of data analysis configurations;
   identifying the data analysis attributes from associated data analysis configurations based on data analysis applications;
   aggregating one or more of data analysis attributes from at least two respective configuration content objects, each configuration content object from a respective data analysis file, the aggregation based on a set of mapping rules for identifying redundant attributes across different relational tables from among the aggregated data analysis attributes,
   the plurality of data analysis configurations codified in the respective configuration content objects accessed by the data analysis applications for performing analyses over a subject dataset;
   based on the data analysis attributes mapped to the semantic model metadata from the mapping rules, determining one or more implementation recommendations associated with the semantic layer, the implementation recommendations being determined based at least in part on at least one of, the one or more data analysis attributes, or the semantic model metadata;
   detecting at least one action event associated with the one or more implementation recommendations, the implementation recommendations indicative of one or more data analysis attributes unused in computing the semantic model metadata;

executing one or more commands to carry out the at least one action event, the commands for reducing or redirecting the attributes defined by the semantic model metadata;

generating a set of operations for satisfying a query request based on accessing at least one additional data set based on the semantic model metadata as a result of the implementation recommendations; and receiving a result set for satisfying the query request and rendering the result set to a user device.

2. The method of claim 1, further comprising:

processing one or more data statements issued by one or more data analysis applications, the one or more data statements being configured to operate over the semantic layer.

3. The method of claim 2, wherein the one or more data statements are configured to operate over at least one of, at least one virtual data model, or one or more virtual cubes, that is associated with the semantic layer.

4. The method of claim 2, wherein the one or more data statements are processed to formulate one or more data operations that are performed over at least one subject dataset.

5. The method of claim 1, further comprising:

creating at least one virtual data model, the at least one virtual data model being created based at least in part on the semantic model metadata.

6. The method of claim 5, wherein the at least one virtual data model is presented to at least one user in at least one user interface.

7. The method of claim 1, wherein the one or more implementation recommendations are presented to at least one user in at least one user interface.

8. The method of claim 1, wherein the plurality of data analysis configurations are accessed by one or more data analysis applications to perform one or more data operations over at least one subject dataset.

9. A computer readable medium, embodied in a non-transitory computer readable medium, the non-transitory computer readable medium having stored thereon a sequence of instructions which, when stored in memory and executed by one or more processors causes the one or more processors to perform a set of acts for generation of semantic layers used to perform data analyses over subject datasets that are described at least in part by subject dataset metadata, the acts comprising:

identifying a plurality of data analysis configurations defined by relational database tables;

determining one or more data analysis attributes associated with the plurality of data analysis configurations; and generating semantic model metadata that constitute a semantic layer, the semantic model metadata being generated based at least in part on the one or more data analysis attributes, at least one of the one or more data analysis attributes mapped to a respective portion of the semantic model metadata based on one or more mapping rules, the data analysis attributes derived from the plurality of data analysis configurations;

identifying the data analysis attributes from associated data analysis configurations based on data analysis applications;

aggregating one or more of data analysis attributes from at least two respective configuration content objects, each configuration content object from a respective data analysis file, the aggregation based on a set of mapping rules for identifying redundant attributes across different relational tables from among the aggregated data analysis attributes, the plurality of data analysis configurations codified in the respective configuration content objects accessed by the data analysis applications for performing analyses over a subject dataset;

based on the data analysis attributes mapped to the semantic model metadata from the mapping rules, determining one or more implementation recommendations associated with the semantic layer, the implementation recommendations being determined based at least in part on at least one of, the one or more data analysis attributes, or the semantic model metadata;

detecting at least one action event associated with the one or more implementation recommendations, the implementation recommendations indicative of one or more data analysis attributes unused in computing the semantic model metadata;

executing one or more commands to carry out the at least one action event, the commands for reducing or redirecting the attributes defined by the semantic model metadata;

generating a set of operations for satisfying a query request based on accessing at least one additional data set based on the semantic model metadata as a result of the implementation recommendations; and receiving a result set for satisfying the query request and rendering the result set to a user device.

10. The computer readable medium of claim 9, further comprising instructions which, when stored in memory and executed by the one or more processors causes the one or more processors to perform acts of:

processing one or more data statements issued by one or more data analysis applications, the one or more data statements being configured to operate over the semantic layer.

11. The computer readable medium of claim 10, wherein the one or more data statements are configured to operate over at least one of, at least one virtual data model, or one or more virtual cubes, that is associated with the semantic layer.

12. The computer readable medium of claim 10, wherein the one or more data statements are processed to formulate one or more data operations that are performed over at least one subject dataset.

13. The computer readable medium of claim 9, further comprising instructions which, when stored in memory and executed by the one or more processors causes the one or more processors to perform acts of:

creating at least one virtual data model, the at least one virtual data model being created based at least in part on the semantic model metadata.

14. The computer readable medium of claim 13, wherein the at least one virtual data model comprises one or more virtual cubes.

15. A system for generation of semantic layers used to perform data analyses over subject datasets that are described at least in part by subject dataset metadata, the system performed by at least one computer, the system comprising:

a storage medium having stored thereon a sequence of instructions; and one or more processors that execute the instructions to cause the one or more processors to perform a set of acts, the acts comprising:

identifying a plurality of data analysis configurations defined by relational database tables;

determining one or more data analysis attributes associated with the plurality of data analysis configurations; and generating semantic model metadata that constitute a semantic layer, the semantic model metadata being generated based at least in part on the one or more data analysis attributes, at least one of the one or more data analysis attributes mapped to a respective portion of the semantic model metadata based on one or more mapping rules, the data analysis attributes derived from the plurality of data analysis configurations;

identifying the data analysis attributes from associated data analysis configurations based on data analysis applications;

aggregating one or more of data analysis attributes from at least two respective configuration content objects, each configuration content object from a respective data analysis file, the aggregation based on a set of mapping rules for identifying redundant attributes across different relational tables from among the aggregated data analysis attributes, the plurality of data analysis configurations codified in the respective configuration content objects accessed by the data analysis applications for performing analyses over a subject dataset;

based on the data analysis attributes mapped to the semantic model metadata from the mapping rules, determining one or more implementation recommendations associated with the semantic layer, the implementation recommendations being determined based at least in part on at least one of, the one or more data analysis attributes, or the semantic model metadata;

detecting at least one action event associated with the one or more implementation recommendations the implementation recommendations indicative of one or more data analysis attributes unused in computing the semantic model metadata;

executing one or more commands to carry out the at least one action event, the commands for reducing or redirecting the attributes defined by the semantic model metadata;

generating a set of operations for satisfying a query request based on accessing at least one additional data set based on the semantic model metadata as a result of the implementation recommendations; and receiving a result set for satisfying the query request and rendering the result set to a user device.

16. The system of claim 15, wherein the plurality of data analysis configurations are accessed by one or more data analysis applications to perform one or more data operations over at least one subject dataset.

* * * * *